United States Patent
Gu et al.

(10) Patent No.: US 6,711,278 B1
(45) Date of Patent: *Mar. 23, 2004

(54) TRACKING SEMANTIC OBJECTS IN VECTOR IMAGE SEQUENCES

(75) Inventors: Chuang Gu, Redmond, WA (US); Ming-Chieh Lee, Bellevue, WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/151,368

(22) Filed: Sep. 10, 1998

(51) Int. Cl.$^7$ ................................................ G06K 9/00
(52) U.S. Cl. ...................... 382/103; 382/199; 382/173; 348/169; 324/284
(58) Field of Search ................................. 382/103, 173, 382/199, 238, 284; 348/169, 402.1, 699, 208.99; 342/104, 28; 324/160; 702/149; 235/411

(56) References Cited

U.S. PATENT DOCUMENTS

| | | |
|---|---|---|
| 4,783,833 A | 11/1988 | Kawabata et al. |
| 5,034,986 A | 7/1991 | Karmann et al. |
| 5,103,305 A | 4/1992 | Watanabe |
| 5,103,306 A | 4/1992 | Weiman et al. |
| 5,117,287 A | 5/1992 | Koike et al. |
| 5,136,659 A | 8/1992 | Kaneko et al. |
| 5,148,497 A | 9/1992 | Pentland et al. |
| 5,175,808 A | 12/1992 | Sayre |
| 5,214,504 A | 5/1993 | Toriu et al. |
| 5,258,836 A | 11/1993 | Murata |
| 5,259,040 A | 11/1993 | Hanna |

(List continued on next page.)

FOREIGN PATENT DOCUMENTS

| | | |
|---|---|---|
| EP | 474 307 A2 | 3/1992 |
| EP | 0579319 A2 | 1/1994 |
| EP | 614 318 A2 | 9/1994 |
| EP | 625 853 A2 | 11/1994 |
| WO | WO 91/11782 | 8/1991 |
| WO | WO9705746 | 2/1997 |

OTHER PUBLICATIONS

Moscheni et al., "Object Tracking Based on Temporal and Spatial Information," ICASSP 96, 1914–17 (May 1996).
International Organization for Standardisation ISO/IEC JTCI/SC29/WG11,N2459 "Overview of the MPEG–4 Standard," (Oct. 1998).

(List continued on next page.)

*Primary Examiner*—Timothy M. Johnson
*Assistant Examiner*—Barry Choobin
(74) *Attorney, Agent, or Firm*—Klarquist Sparkman, LLP

(57) ABSTRACT

A semantic object tracking method tracks general semantic objects with multiple non-rigid motion, disconnected components and multiple colors throughout a vector image sequence. The method accurately tracks these general semantic objects by spatially segmenting image regions from a current frame and then classifying these regions as to which semantic object they originated from in the previous frame. To classify each region, the method performs a region based motion estimation between each spatially segmented region and the previous frame to compute the position of a predicted region in the previous frame. The method then classifies each region in the current frame as being part of a semantic object based on which semantic object in the previous frame contains the most overlapping points of the predicted region. Using this method, each region in the current image is tracked to one semantic object from the previous frame, with no gaps or overlaps. The method propagates few or no errors because it projects regions into a frame where the semantic object boundaries are previously computed rather than trying to project and adjust a boundary in a frame where the object's boundary is unknown.

31 Claims, 3 Drawing Sheets

U.S. PATENT DOCUMENTS

| | | |
|---|---|---|
| 5,274,453 A | 12/1993 | Maeda |
| 5,295,201 A | 3/1994 | Yokohama |
| 5,329,311 A | 7/1994 | Ward et al. |
| 5,376,971 A | 12/1994 | Kadono et al. |
| 5,471,535 A | 11/1995 | Ikezawa et al. |
| 5,524,068 A | 6/1996 | Kacandes et al. |
| 5,546,129 A | 8/1996 | Lee |
| 5,557,684 A | 9/1996 | Wang et al. |
| 5,572,258 A | 11/1996 | Yokoyama |
| 5,577,131 A | 11/1996 | Oddou |
| 5,581,308 A | 12/1996 | Lee |
| 5,598,215 A | 1/1997 | Watanabe |
| 5,598,216 A | 1/1997 | Lee |
| 5,612,743 A | 3/1997 | Lee |
| 5,619,281 A | 4/1997 | Jung |
| 5,627,591 A | 5/1997 | Lee |
| 5,654,771 A | 8/1997 | Tekalp et al. |
| 5,666,434 A | 9/1997 | Nishikawa et al. |
| 5,668,608 A | 9/1997 | Lee |
| 5,673,339 A | 9/1997 | Lee |
| 5,684,509 A | 11/1997 | Hatanaka et al. |
| 5,684,886 A | 11/1997 | Kamada et al. |
| 5,692,063 A | 11/1997 | Lee et al. |
| 5,694,487 A | 12/1997 | Lee |
| 5,706,417 A | 1/1998 | Adelson |
| 5,717,463 A | 2/1998 | Brailean et al. |
| 5,731,836 A * | 3/1998 | Lee .............................. 384/402 |
| 5,731,849 A | 3/1998 | Kondo et al. |
| 5,734,737 A | 3/1998 | Chang et al. |
| 5,748,789 A | 5/1998 | Lee et al. |
| 5,761,326 A * | 6/1998 | Brady et al. ................. 382/103 |
| 5,761,341 A | 6/1998 | Go |
| 5,764,805 A * | 6/1998 | Martucci et al. ............ 382/238 |
| 5,764,814 A | 6/1998 | Chen et al. |
| 5,778,098 A | 7/1998 | Lee et al. |
| 5,784,175 A | 7/1998 | Lee |
| 5,802,220 A | 9/1998 | Black et al. |
| 5,809,161 A | 9/1998 | Auty et al. |
| 5,864,630 A * | 1/1999 | Cosatto et al. ............... 382/103 |
| 5,923,365 A * | 7/1999 | Tamir et al. ................. 348/169 |
| 5,946,043 A | 8/1999 | Lee et al. |
| 5,946,419 A | 8/1999 | Chen et al. |
| 5,978,497 A | 11/1999 | Lee et al. |
| 5,982,909 A * | 11/1999 | Erdem et al. ............... 382/103 |
| 6,005,493 A | 12/1999 | Taniguchi et al. |
| 6,005,625 A | 12/1999 | Yokoyama |
| 6,011,596 A * | 1/2000 | Burl et al. ................... 348/699 |
| 6,026,182 A | 2/2000 | Lee et al. |
| 6,037,988 A | 3/2000 | Gu et al. |
| 6,075,875 A | 6/2000 | Gu |
| 6,097,854 A * | 8/2000 | Szeliski et al. ............. 382/284 |

OTHER PUBLICATIONS

Irani et al., "Video Indexing Based on Mosaic Representations," Proc. IEEE, vol. 86, No. 5, pp. 905–921 (May 1998).

Moscheni et al., "Object Tracking Based on Temporal and Spatial Information," ICASSP 96, 1914–17 (May 1996).

Toklu et al., "Simultaneous Alpha Map Generation and 2–D Mesh Tracking for Multimedia Applications," ICIP 97, pp. 113–116 (Oct. 1997).

Aggarwal et al., "Corresponding Processes in Dynamic Scene Analysis," Proc. IEEE, vol. 69, No. 5, pp. 562–572 (1981).

Adiv, "Determining Three–Dimentional Motion and Structure From Optical Flow Generated By Several Moving Objects," IEEE Trans. On PAMI, vol. 7, pp. 384–401 (1985).

Ayer et al., "Segmentation of Moving Objects by Robust Motion Parameter Estimation Over Multiple Frames," Proc. 3 European Conference on Computer Vision, Stockholm, Sweden, pp. 316–327 (1994).

Bouthemy et al, "Motion Segmentation and Qualitative Dynamic Scene Analysis from An Image Sequence," Intl Journal of Computer Vision, vol. 10, No. 2, pp. 157–182 (1993).

Chang et al., "Next Generation Content Representation, Creation, and Searching for New–Media Applications in Education," Proc. IEEE, vol. 86, No. 5, 884–904 (1998).

Crisman, "Color Region Tracking for Vehicle Guidance," Active Vision, Blake and Yuille ed., MIT Press, Cambridge, pp. 107–120 (1992).

Curwen et al., "Dynamic Countours: Real–time Active Splines," Active Vision, Blake and Yuille ed., MIT Press, Cambridge, pp. 39–58 (1992).

Deriche et al., "Tracking Line Segments," ECCV'90, pp. 259–268 (1990).

Dickmanns, "Expectation–based Dynamic Scene Understanding," Active Vision, Blake and Yuille ed., MIT Press, Cambridge, pp. 303–335 (1992).

Goh et al., "Model–Based Multi–Resolution Motion Estimation in Noisy Images," CVGIP: Image Understanding, vol. 59, No. 3, pp. 307–319 (1994).

Gordon, "On the Tracking of Featureless Objects with Occlusion," IEEE Workshop on Visual Motion, Irving, pp. 13–20 (1989).

Guo et al., "Tracking of Human Body Motion Based on a Stick Figure Model," Journal of Visual Communication and Image Representation, vol. 5, No. 1, pp. 1–9 (1994).

Harris, "Tracking and Rigid Models," Active Vision, Blake and Yuille ed., MIT Press, Cambridge, pp. 59–74 (1992).

Horowitz et al., "Picture Segmentation By a Tree Traversal Algorithm," J. ACM, vol. 23, No. 3, pp. 368–388 (1976).

Irani et al., "Detecting and Tracking Multiple Moving Objects Using Temporal Integration," In Proc. $2^{nd}$ European Conference on Computer Vision, pp. 282–287 (1992).

Kass et al., "Snakes: Active Contour Models," Proc. Int'l. Conference Computer Vision, London, pp. 259–268 (1987).

Legters et al., "A Mathematical Model for Computer Image Tracking," IEEE Trans. On Pattern Analysis and Machine Intelligence, vol. 4, No. 6, pp. 583–594 (1982).

Mitiche et al., "Computation and Analysis of Image Motion: A Synopsis of Current Problems and Methods," Intl. Journal of Computer Vision, vol. 19, No. 1, pp. 29–55 (1996).

Murray et al., "Scene Segmentation From Visual Motion Using Global Optimization," IEEE Trans. On Pattern Analysis and Machine Intelligence, vol. 9, No. 2, pp. 220–228 (1987).

Nagel et al., "Motion Boundary Detection In Image Sequences by Local Stochastic Tests," In 3 Proc. European Conference On Computer Vision, Stockholm, pp. 305–315 (1994).

Nicolas et al., "Global Motion Identification For Image Sequence Analysis and Coding," Proc. ICASSP, Toronto, pp. 2825–2828 (1992).

Odobez et al., "Robust Multiresolution Estimation of Parametric Motion Models," J. Visual Communication and Image Representation, vol. 6, No. 4, pp. 248–265 (1995).

Rao, "Data Association Methods for Tracking Systems," Active Vision, Blake and Yuille ed., MIT Press, Cambridge, 91–106 (1992).

Rogmone, "Identifying Multiple Motions from Optical Flow," In Proc. 2 European Conference On Computer Vision, pp. 258–266 (1992).

Schalkoff et al., "A Model and Tracking Algorithm for a Class of Video Targets," IEEE Trans. On Pattern Analysis and Machine Intelligence, vol. 4, No. 1, pp. 2–10 (1982).

Sethi et al., "Finding Trajectories of Feature Points in a Monocular Image Sequence," IEEE Trans. On PAMI, vol. 9, No. 1, pp. 56–73 (1987).

Terzopoulos et al., "Tracking with Kalman Snakes," Active Vision, Blake and Yuille ed., MIT Press, Cambridge, pp. 3–20 (1992).

Terzopoulos et al., "Tracking Nonrigid 3D Objects," Active Vision, Blake and Yuille ed., MIT Press, Cambridge, pp. 75–90 (1992).

Thompson et al., "Detecting Moving Objects," Intl. Journal of Computer Vision, vol. 4, pp. 39–57 (1990).

Torr et al., "Statistical Detection of Independent Movement From a Moving Camera," J. Image and Vision Computing, vol. 11, No. 4, pp. 180–187 (1993).

Ueda et al., "Tracking Moving Contours Using Energy Minimizing Elastic Contour Models," Computer Vision ECCV'92, vol. 588, pp. 453–457, Springer Verlag (1992).

Wu et al., "A Gradient–Based Method for General Motion Estimation and Segmentation," J. Visual Communication and Image Representation, vol. 4, No. 1, pp. 25–38 (1993).

Yao et al., "Tracking a Dynamic Set of Feature Points," IEEE Trans. On Image Processing, vol. 4, No. 10, pp. 1382–1395 (1995).

Yuille et al., "Deformable Templates," Active Vision, Blake and Yuille Ed., MIT Press, Cambridge, pp. 21–38 (1992).

Zhong et al., "AMOS: An Active System for MPEG–4 Video Object Segmentation," ICIP'98, Chicago, vol. 2, pp. 647–651 (1998).

Diehl, "Object–Oriented Motion Estimation And Segmentation In Image Sequences," *Signal Processing Image Communication*, vol. 3, No. 1, pp. 23–56 (1991).

Gu, C., "Combined Gray–Level and Motion Segmentation for Very Low Bit–Rate Coding," SPIE, vol. 2451, pp. 121–129 (Mar. 20, 1995).

Wu, L. et al., "Spatio–Temporal Segmentation of Image Sequences for Object–Oriented Low Bit–Rate Image Coding," Signal Processing: Image Communication 8, vol. 8, No. 6, pp. 513–543 (1996).

Gu, C. et al., "Semiautomatic Segmentation and Tracking of Semantic Video Objects," IEEE Transactions on Circuits and Systems for Video Technology, vol. 8, No. 5, pp. 572–584 (Sep. 1998).

Salembier, P., et al., "Segmentation–Based Video Coding System Allowing the Manipulation of Objects," IEEE Transactions on Circuits and Systems for Video Technology, vol. 7, No. 1, pp. 60–73 (Feb. 1997).

Gu, C., et al., "Semantic Video Object Tracking Using Region–Based Classification," Proc. of IPCIP '98 Int'l Conf. on Image Processing, Chicago, IL, pp. 643–647 (Oct. 1998).

Gu, C., et al., "Tracking of Multiple Semantic Video Objects for Internet Applications," Part of IS&T/SPIE Conf. on Visual Comm. and Image Processing'99, San Jose, CA, pp. 806–820 (Jan. 1999).

Sanson, *Motion Affine Models Identification and Application to Television Image Coding*, SPIE vol. 1605 Visual Communications and Image Processing '91: Visual Communications, Nov. 11, 1991, pp. 570–581.

Hötter, *Optimization and Efficiency of an Object–Oriented Analysis–Synthesis Coder*, IEEE Transactions on Circuits and Systems for Video Technology, Apr. 4, 1994, No. 2, pp 181–194.

Zakhor et al., *Edge–Based 3–D Camera Motion Estimation with Application to Video Coding*, IEEE Transactions on Image Processing, vol. 2, Oct. 2, 1993, pp. 481–498.

Ozer, *Why MPEG is Hot*, PC Magazine, Apr. 11, 1995, pp. 130–131.

Franke et al., *Constrained Iterative Restoration Techniques: A Powerful Tool in Region Oriented Texture Coding*, Signal Processing IV: Theories And Applications, Sep. 1988, pp. 1145–1148.

Pennebaker et al., *JPEG Still Image Data Compression Standard*, Chapter 20, pp. 325–349, 1993.

John Y.A. Wang and Edward H. Adelson, "Representing Moving Images With Layers," IEEE, Transactions on Image Processing, vol. 3, No. 5, Sep. 1994, pp. 625–637.

Didler LaCall, "MPEG: A Video Compression Standard for Multimedia Applications," Communications of the ACM, Apr. 1991, vol. 34, No. 4, pp. 47–58.

Gu, Chang, "Multivalued Morphology and Segmentation–Based Coding", Ph.D. dissertation, LTS/–EPFL, http://–Itswww.–epfi.–ch/– Staff/gu.html, 1995.

Canny, John, A. Computational Approach to Edge Detection, IEEE Transactions on Pattern Analysis and Machine Intelligence, vol. PAMI–8, No. 6, Nov., 1986, pp. 679–698.

Burt et al., Segmentation and Estimation of Image Region Properties Through Cooperative Hierarchial Computation, IEEE Transactions on Systems, Man, and Cybernetics, vol. SMC–11, No. 12, Dec. 1981, pp. 802–809.

Meyer, F., Color Image Segmentation, 4th International Conference on Image Processing and its Applications, May 1992, pp. 303–306.

Haralick et al., Image Segmentation Techniques, Computer Vision, Graphics and Image Processing, vol. 29, 1985, pp. 100–132.

Chen et al., Image Segmentation as an Estimation Problem, Computer Graphics and Image Processing, vol. 12, 1980, pp. 153–172.

Meyer et al., *Region–Based Tracking Using Affine Motion Models in Long Image Sequences*, CVGIP: Image Understanding, vol. 60, No. 2, Sep. 1994, pp. 119–140.

*Video Coding for Low Bitrate Communication*, Draft Recommendation H.263, International Telecommunication Union, Dec. 1995, 51 pages.

Foley et al., *Computer Graphics Principles and Practice*, Addison–Wesley Publishing Company, Inc., 1990, pp. 835–851.

Nieweglowski et al., *A Novel Video Coding Scheme Based on Temporal Prediction Using Digital Image Warping*, IEEE Transactions on Consumer Electronics, vol. 39, No. 3, Aug. 1993, pp 141–150.

Orchard, *Predictive Motion–Field Segmentation for Image Sequence Coding*, IEEE Transactions on Circuits and Systems for Video Technology, vol. 3, No. 1, Feb. 1993, pp 54–70.

Seferidis et al., *General Approach to Block–Matching Motion Estimation*, Optical Engineering, vol. 32, No. 7, Jul. 1993, pp. 1464–1474.

Chang et al., *Transform Coding of Arbitrarily–Shaped Image Segments*, Proceedings of the ACM Multimedia 93, Aug. 1, 1993, pp. 83–90.

Chen et al., *A Block Transform Coder for Arbitrarily Shaped Image Segments*, ICIP–94, vol. I/III, Nov. 13, 1994, pp. 85–89.

Gu, Chang, "3D Contour Image Coding Based on Morphological Filters and Motion Estimation," ICASSP94 1994, pp. 277–280.

Gu et al., "Morphological Moving Object Segmentation and Tracking for Content–Based Video Coding," International Symposium on Multimedia Communication and Video Coding, New York, Oct. 11–13, 1995, Plenum Press.

Marr, *Vision*, W.H. Freeman, New York, Chapter 4, pp. 268–294, 1982.

Rui, Y., T. Huang and S. Chang, "Digital Image/Video Library and MPEG–7: Standardization and Research Issues," ICASSP''98, May 1998, Seattle.

Brady N., and N. O'Connor, "Object Detection and tracking using an em–based motion estimation and segmentation framework" ICIP'96, vol. I, pp. 925–928, Lausanne, Switzerland, Sep. 1996.

M.J. Black, "Combining intensity and motion for incremental segmentation and tracking over long image sequences," ECCV'92, pp. 485–493, Santa Margherita, Italy, May 1992.

Brady, Noel, Noel Murphy and Tommy Curran, "Computationally Efficient Estimation of Polynomial Model–based Motion," Proceedings of Picture Coding Symposium 1996, Melbourn, Mar. 1996.

Fogg, Chad, "Image and Video Compression" SPIE–The International Society for Optical Engineering Proceedings, vol. 2186, 1994.

Cover et al., Nearest Neighbor Pattern Classification, IEEE Transactions on Information Theory, vol. IT–13, Jan. 1967, pp. 21–27.

Salembier et al., "Region–Based Video Coding Using Mathematical Morphology," Proceedings of the IEEE, vol. 83, No. 6, pp. 843–857, Jun. 1995.

Kunt et al., "Second Generation Image–Coding Techniques," Proceedings of IEEE, vol. 73, No. 4, 1985.

Mussman et al., "Object–Oriented Analysis–Synthesis Coding of Moving Images," *Signal Processing: Image Communications*, 1(1989), pp. 117–138.

Meyer et al., "Region–Based Tracking in an Image Sequence," *Signal Processing: Image Communications*, vol. 1, No. 2, Oct. 1989, pp. 476–484.

Marqu$_e$s et al., "Object Tracking for Content–Based Functionalities", SPIE, vol. 3024, 1997, pp. 190–199.

International Organization for Standardisation ISO/IEC JTCI/SC29/WG11, Information Technology–Coding of Audio–Visual Objects: Visual, "Preprocessing and Postprocessing," ISO/IEC 14496–2, May 28, 1998, pp. 303–308.

International Organization for Standardisation ISO/IEC JTCI/SC29/WG11, Information Technology–Coding of Audio–Visual Objects: Visual, ISO/IEC 14496–2, May 28, 1998, pp. 183–190.

International Organization for Standardisation ISO/IEC JTCI/SC29/WG11, Information Technology–Coding of Audio–Visual Objects: Visual, ISO/IEC 14496–2, May 28, 1998, pp. 159–311.

Haddad et al., *Digital Signal Processing, Theory, Applications, and Hardware*, 1991, pp. 257–261.

Lee et al., "A Layered Video Object Coding System Using Sprite and Affine Motion Model," IEEE Transactions on Circuits and Systems for Video Technology, vol. 7, No. 1, Feb. 1997.

Pipitone, F., W. Adams, "Tripod operators for recognizing objects in range images: rapid rejection of library objects," Proceedings of the 1992 IEEE International Conference on Robotics and Automation, May 1992.

ISO, ISO/IEC JTC1/SC29/WG11 MPEG 97/N1642, "MPEG–4 Video Verification Model Version 7.0 3. Encoder Definition," pp. 1, 17–122 Bristol (Apr. 1997).

* cited by examiner

TRACKING SEMANTIC OBJECTS IN VECTOR IMAGE SEQUENCES

FIELD OF THE INVENTION

The invention relates to analysis of video data, and more, specifically relates to a method for tracking meaningful entities called semantic objects as they move through a sequence of vector images such as a video sequence.

BACKGROUND OF THE INVENTION

A semantic video object represents a meaningful entity in a digital video clip, e.g., a ball, car, plane, building, cell, eye, lip, hand, head, body, etc. The term "semantic" in this context means that the viewer of the video clip attaches some semantic meaning to the object. For example, each of the objects listed above represent some real-world entity, and the viewer associates the portions of the screen corresponding to these entities with the meaningful objects that they depict. Semantic video objects can be very useful in a variety of new digital video applications including content-based video communication, multimedia signal processing, digital video libraries, digital movie studios, and computer vision and pattern recognition. In order to use semantic video objects in these applications, object segmentation and tracking methods are needed to identify the objects in each of the video frames.

The process of segmenting a video object refers generally to automated or semi-automated methods for extracting objects of interest in image data. Extracting a semantic video object from a video clip has remained a challenging task for many years. In a typical video clip, the semantic objects may include disconnected components, different colors, and multiple rigid/non-rigid motions. While semantic objects are easy for viewers to discern, the wide variety of shapes, colors and motion of semantic objects make it difficult to automate this process on a computer. Satisfactory results can be achieved by having the user draw an initial outline of a semantic object in an initial frame, and then use the outline to compute pixels that are part of the object in that frame. In each successive frame, motion estimation can be used to predict the initial boundary of an object based on the segmented object from the previous frame. This semi-automatic object segmentation and tracking method is described in co-pending U.S. patent application Ser. No. 09/054,280, by Chuang Gu, and Ming Chieh Lee, entitled Semantic Video Object Segmentation and Tracking, which is hereby incorporated by reference.

Object tracking is the process of computing an object's position as it moves from frame to frame. In order to deal with more general semantic video objects, the object tracking method must be able to deal with objects that contain disconnected components and multiple non-rigid motions. While a great deal of research has focused on object tracking, existing methods still do not accurately track objects having multiple components with non-rigid motion.

Some tracking techniques use homogeneous gray scale/color as a criterion to track regions. See F. Meyer and P. Bouthemy, "Region-based tracking in an image sequence", ECCV'92, pp. 476–484, Santa Margherita, Italy, May 1992; Ph. Salembier, L. Torres, F. Meyer and C. Gu, "Region-based video coding using mathematical morphology", Proceeding of the IEEE, Vol. 83, No. 6, pp. 843–857, June 1995; F. Marques and Cristina Molina, "Object tracking for content-based functionalities", VCIP'97, Vol. 3024, No. 1, pp. 190–199, San Jose, February, 1997; and C. Toklu, A. Tekalp and A. Erdem, "Simultaneous alpha map generation and 2-D mesh tracking for multimedia applications", ICIP'97, Vol. 1, page 113–116, October, 1997, Santa Barbara.

Some employ homogenous motion information to track moving objects. See for example, J. Wang and E. Adelson, "Representing moving images with layers", IEEE Trans. on Image Processing, Vol. 3, No. 5. pp. 625–638, September 1994 and N. Brady and N. O'Connor, "Object detection and tracking using an em-based motion estimation and segmentation framework", ICIP'96, Vol. I, pp. 925–928, Lausanne, Switzerland, September 1996.

Others use a combination of spatial and temporal criteria to track objects. See M. J. Black, "Combining intensity and motion for incremental segmentation and tracking over long image sequences", ECCV'92, pp. 485–493, Santa Margherita, Italy, May 1992; C. Gu, T. Ebrahimi and M. Kunt, "Morphological moving object segmentation and tracking for content-based video coding", Multimedia Communication and Video Coding, pp. 233–240, Plenum Press, New York, 1995; F. Moscheni, F. Dufaux and M. Kunt, "Object tracking based on temporal and spatial information", in Proc. ICASSP'96, Vol. 4, pp. 1914–1917, Atlanta, Ga., May 1996; and C. Gu and M. C. Lee, "Semantic video object segmentation and tracking using mathematical morphology and perspective motion model", ICIP'97, Vol. II, pages 514–517, October 1997, Santa Barbara.

Most of these techniques employ a forward tracking mechanism that projects the previous regions/objects to the current frame and somehow assembles/adjusts the projected regions/objects in the current frame. The major drawback of these forward techniques lies in the difficulty of either assembling/adjusting the projected regions in the current frame or dealing with multiple non-rigid motions. In many of these cases, uncertain holes may appear or the resulting boundaries may become distorted.

FIGS. 1A–C provide simple examples of semantic video objects to show the difficulties associated with object tracking. FIG. 1A shows a semantic video object of a building 100 containing multiple colors 102, 104. Methods that assume that objects have a homogenous color do not track these types of objects well. FIG. 1B shows the same building object of FIG. 1A, except that it is split into disconnected components 106, 108 by a tree 110 that partially occludes it. Methods that assume that objects are formed of connected groups of pixels do not track these types of disconnected objects well. Finally, FIG. 1C illustrates a simple semantic video object depicting a person 112. Even this simple object has multiple components 114, 116, 118, 120 with different motion. Methods that assume an object has homogenous motion do not track these types of objects well. In general, a semantic video object may have disconnected components, multiple colors, multiple motions, and arbitrary shapes.

In addition to dealing with all of these attributes of general semantic video objects, a tracking method must also achieve an acceptable level of accuracy to avoid propagating errors from frame to frame. Since object tracking methods typically partition each frame based on a previous frame's partition, errors in the previous frame tend to get propagated to the next frame. Unless the tracking method computes an object's boundary with pixel-wise accuracy, it will likely propagate significant errors to the next frame. As result, the object boundaries computed for each frame are not precise, and the objects can be lost after several frames of tracking.

SUMMARY OF THE INVENTION

The invention provides a method for tracking semantic objects in vector image sequences. The invention is particularly well suited for tracking semantic video objects in digital video clips, but can also be used for a variety of other vector image sequences. While the method is implemented in software program modules, it can also be implemented in digital hardware logic or in a combination of hardware and software components.

The method tracks semantic objects in an image sequence by segmenting regions from a frame and then projecting the segmented regions into a target frame where a semantic object boundary or boundaries are already known. The projected regions are classified as forming part of a semantic object by determining the extent to which they overlap with a semantic object in the target frame. For example, in a typical application, the tracking method repeats for each frame, classifying regions by projecting them into the previous frame in which the semantic object boundaries are previously computed.

The tracking method assumes that semantic objects are already identified in the initial frame. To get the initial boundaries of a semantic object, a semantic object segmentation method may be used to identify the boundary of the semantic object in an initial frame.

After the initial frame, the tracking method operates on the segmentation results of the previous frame and the current and previous image frames. For each frame in a sequence, a region extractor segments homogenous regions from the frame. A motion estimator then performs region based matching for each of these regions to identify the most closely matching region of image values in the previous frame. Using the motion parameters derived in this step, the segmented regions are projected into the previous frame where the semantic boundary is already computed. A region classifier then classifies the regions as being part of semantic object in the current frame based on the extent to which the projected regions overlap semantic objects in the previous frame.

The above approach is particularly suited for operating on an ordered sequence of frames. In these types of applications, the segmentation results of the previous frame are used to classify the regions extracted from the next frame. However, it can also be used to track semantic objects between an input frame and any other target frame where the semantic object boundaries are known.

One implementation of the method employs a unique spatial segmentation method. In particular, this spatial segmentation method is a region growing process where image points are added to the region as long as the difference between the minimum and maximum image values for points in the region are below a threshold. This method is implemented as a sequential segmentation method that starts with a first region at one starting point, and sequentially forms regions one after the other using the same test to identify homogenous groups of image points.

Implementations of the method include other features to improve the accuracy of the tracking method. For example, the tracking method preferably includes region-based pre-processing to remove image errors without blurring object boundaries, and post-processing on the computed semantic object boundaries. The computed boundary of an object is formed from the individual regions that are classified as being associated with the same semantic object in the target frame. In one implementation, a post processor smooths the boundary of a semantic object using a majority operator filter. This filter examines neighboring image points for each point in a frame and determines the semantic object that contains the maximum number of these points. It then assigns the point to the semantic object containing the maximum number of points.

Further advantages and features of the invention will become apparent in the following detailed description and accompanying drawings.

DETAILED DESCRIPTION

Overview of a Semantic Object Tracking System

The following sections describe a semantic object tracking method. This method assumes that the semantic object for the initial frame (I-frame) is already known. The goal of the method is to find the semantic partition image in the current frame based on the information from the previous semantic partition image and the previous frame.

One fundamental observation about the semantic partition image is that the boundaries of the partition image are located at the physical edges of a meaningful entity. A physical edge is the position between two connected points where the image value (e.g., a color intensity triplet, gray scale value, motion vector, etc.) at these points are significantly different. Taking advantage of this observation, the tracking method solves the semantic video object tracking method using a divide-and-conquer strategy.

First, the tracking method finds the physical edges in the current frame. This is realized using a segmentation method, and in particular, a spatial segmentation method. The goal of this segmentation method is to extract all the connected regions with homogeneous image values (e.g., color intensity triplets, gray scale values, etc.) in the current frame. Second, the tracking method classifies each extracted region in the current frame, to determine which object in the previous frame it belongs to. This classification analysis is a region-based classification problem. Once the region-based classification problem is solved, the semantic video object in the current frame has been extracted and tracked.

Figure 2:
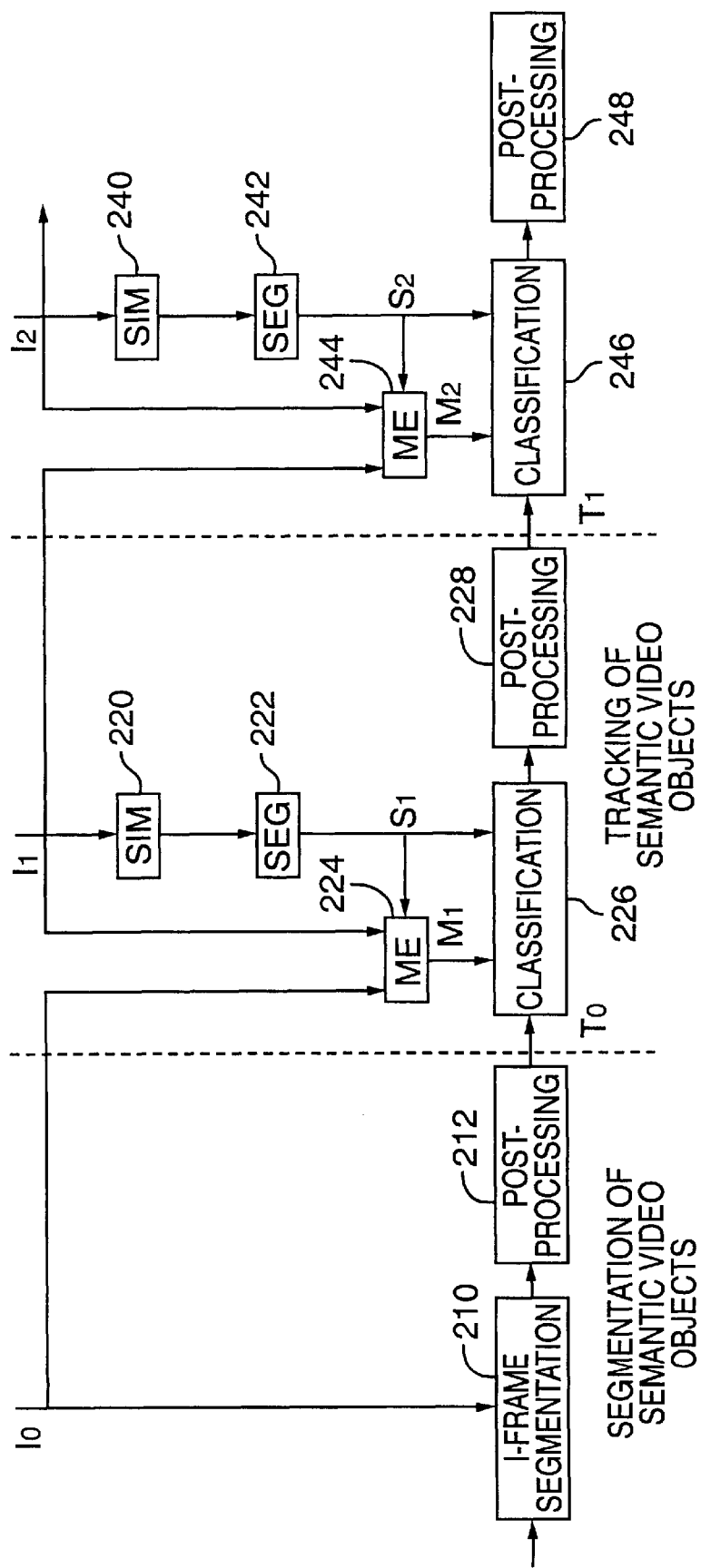
FIG. 2 is a block diagram illustrating a semantic object tracking system.

FIG. 2 is a diagram illustrating the semantic video object tracking system. The tracking system comprises the following five modules:

1. region pre-processing 220;
2. region extraction 222;
3. region based motion estimation 224;
4. region-based classification 226; and
5. region post-processing 228.

FIG. 2 uses the following notation:

$I_i$—input image for frame i;

$S_i$—spatial segmentation results for frame i;

$M_i$—motion parameters for frame i; and $T_i$—tracking results for frame i.

The tracking method assumes that the semantic video object for the initial frame $I_0$ is already known. Starting with an initial frame, a segmentation process determines an initial partition defining boundaries of semantic objects in the frame. In FIG. 2, the I-segmentation block 210 represents a program for segmenting a semantic video object. This program takes the initial frame $I_0$ and computes the boundary of a semantic object. Typically, this boundary is represented as a binary or alpha mask. A variety of segmentation approaches may be used to find the semantic video object(s) for the first frame.

As described in co-pending U.S. patent application Ser. No. 09/054,280 by Gu and Lee, one approach is to provide a drawing tool that enables a user to draw a border around the inside and outside of a semantic video object's boundary. This user-drawn boundary then serves as a starting point for an automated method for snapping the computed boundary to the edge of the semantic video object. In applications involving more than one semantic video object of interest, the I-segmentation process 210 computes a partition image, e.g., a mask, for each one.

The post-processing block 212 used in the initial frame is a process for smoothing the initial partition image and for removing errors. This process is the same or similar to post-processing used to process the result of tracking the semantic video object in subsequent frames, $I_1$, $I_2$.

The input for the tracking process starting in the next frame ($I_1$) includes the previous frame $I_0$ and the previous frames segmentation results $T_0$. The dashed lines 216 separate the processing for each frame. Dashed line 214 separates the processing for the initial frame and the next frame, while dashed line 216 separates the processing for subsequent frames during the semantic video object tracking frames.

Semantic video object tracking begins with frame $I_1$. The first step is to simplify the input frame $I_1$. In FIG. 2, simplification block 220 represents a region-preprocessing step used to simplify the input frame $I_1$ before further analysis. In many cases, the input data contains noise that may adversely effect the tracking results. Region-preprocessing removes noise and ensures that further semantic object tracking is carried out on the cleaned input data.

The simplification block 220 provides a cleaned result that enables a segmentation method to extract regions of connected pixels more accurately. In FIG. 2, the segmentation block 222 represents a spatial segmentation method for extracting connected regions with homogeneous image values in the input frame.

For each region, the tracking system determines whether a connected region originates from the previous semantic video object. When the tracking phase is complete for the current frame, the boundary of the semantic video object in the current frame is constructed from the boundaries of these connected regions. Therefore, the spatial segmentation should provide a dependable segmentation result for the current frame, i.e., no region should be missing and no region should contain any area that does not belong to it.

The first step in determining whether a connected region belongs to the semantic video object is matching the connected region with a corresponding region in the previous frame. As shown in FIG. 2, a motion estimation block 224 takes the connected regions and the current and previous frames as input and finds a corresponding region in the previous frame that most closely matches each region in the current frame. For each region, the motion estimation block 224 provides the motion information to predict where each region in the current frame comes from in the previous frame. This motion information indicates the location of each region's ancestor in the previous frame. Later, this location information is used to decide whether the current region belongs to the semantic video object or not.

Next, the tracking system classifies each region as to whether it originates from the semantic video object. In FIG. 2, the classification block 226 identifies the semantic object in the previous frame that each region is likely to originate from. The classification process uses the motion information for each region to predict where the region came from in the previous frame. By comparing the predicted region with the segmentation result of the previous frame, the classification process determines the extent to which the predicted region overlaps a semantic object or objects already computed for the previous frame. The result of the classification process associates each region in the current frame either with a semantic video object or the background. A tracked semantic video object in the current frame comprises the union of all the regions linked with a corresponding semantic video object in the previous frame.

Finally, the tracking system post-processes the linked regions for each object in FIG. 2, post processing block 228 fine tunes the obtained boundaries of each semantic video object in the current image. This process removes errors introduced in the classification procedure and smoothes the boundaries to improve the visual effect.

For each subsequent frame, the tracking system repeats the same steps in an automated fashion using the previous frame, the tracking result of the previous frame and the current frame as input. FIG. 2 shows an example of the processing steps repeated for frame $I_2$. Blocks 240–248 represent the tracking system steps applied to the next frame.

Unlike other region and object tracking systems that employ various forward tracking mechanisms, the tracking system shown in FIG. 2 performs backward tracking. The backward region-based classification approach has the advantage that the final semantic video object boundaries will always be positioned in the physical edges of a meaningful entity as a result of the spatial segmentation. Also, since each region is treated individually, the tracking system can easily deal with disconnected semantic video objects or non-rigid motions.

Definitions

Before describing an implementation of the tracking system, it is helpful to begin with a series of definitions used throughout the rest of the description. These definitions help illustrate that the tracking method applies not only to sequences of color video frames, but to other temporal sequences of multi-dimensional image data. In this context, "multi-dimensional" refers to the spatial coordinates of each discrete image point, as well as the image value at that point. A temporal sequence of image data can be referred to as a "vector image sequence" because it consists of successive frames of multi-dimensional data arrays. As an example of a vector image sequence, consider the examples listed in Table 1 below:

TABLE 1

Several types of input data as a vector image sequences

| Vector image | Dimensions | Explanation |
| --- | --- | --- |
| $I_t:(x, y) \rightarrow Y$ | n = 2, m = 1 | gray-tone image sequence |
| $I_t:(x, y) \rightarrow (V_x, V_y)$ | n = 2, m = 2 | dense motion vector sequence |
| $I_t:(x, y) \rightarrow (R, G, B)$ | n = 2, m = 3 | color image sequence |

TABLE 1-continued

Several types of input data as a vector image sequences

| Vector image | Dimensions | Explanation |
| --- | --- | --- |
| $I_t:(x, y, z) \to Y$ | n = 3, m = 1 | gray-tone volume image sequence |
| $I_t:(x, y, z) \to (V_x, V_y)$ | n = 3, m = 2 | dense motion vector volume sequence |
| $I_t:(x, y, z) \to (R, G, B)$ | n = 3, m = 3 | color volume image sequence |

The dimension, n, refers to the number of dimensions in the spatial coordinates of an image sample. The dimension, m, refers to the number of dimensions of the image value located at the spatial coordinates of the image sample. For example, the spatial coordinates of a color volume image sequence include three spatial coordinates defining the location of an image sample in three-dimensional space, so n=3. Each sample in the color volume image has three color values, R, G, and B, so m=3.

The following definitions provide a foundation for describing the tracking system in the context of vector image sequences using set and graph theory notation.

Definition 1 Connected Points:

Let S be a n-dimensional set: a point $p \in S \to p=(p_1, \ldots, p_n)$. $\forall p, q \in S$, p and q are connected if and only if their distance $D_{p,q}$ is equal to one:

$$D_{p,q} = \sum_{k=1}^{n} |p_k - q_k| = 1$$

Definition 2 Connected Path:

Let $P(P \subseteq S)$ be a path which is consisted of m points: $p_1, \ldots, p_m$. Path P is connected if and only if $p_k$ and $p_{k+1}(k \in \{1, \ldots, m-1\})$ are connected points.

Definition 3 Neighborhood Point:

Let $R(R \subseteq S)$ be a region. A point $p(p \notin R)$ is neighborhood of region R if and only if $\exists$ another point $q(q \in R)$ p and q are connected points.

Definition 4 Connected Region:

Let $R(R \subseteq S)$ be a region. R is a connected region if and only if $\forall x, y \in R$, $\exists$ a connected path $P(P=\{p_1, \ldots, p_m\})$ where $p_1=x$ and $p_n=y$.

Definition 5 Partition Image:

A partition image P is a mapping P: $S \to T$ where T is a complete ordered lattice. Let $R_p(x)$ be the region containing a point x: $R_p(x) = \cup_{y \in S}\{|P(x)=P(y)\}$. A partition image should satisfy the following condition: $\forall x, y \in S$, $R_p(x)=R_p(y)$ or $R_p(x) \cap R_p(y) = \bot$; $\cap_{x \in S} R_p(x) = S$.

Definition 6 Connected Partition Image:

A connected partition image is a partition image P where $\forall x \in S$, $R_p(x)$ is always connected.

Definition 7 Fine Partition:

If a partition image P is finer than another partition image P' on S, this means $\forall x \in S$, $R_p(x) \supseteq R_{p'}(x)$.

Definition 8 Coarse Partition:

If a partition image P is coarser than another partition image P' on S, this means $\forall x \in S$, $R_p(x) \subseteq R_{p'}(x)$.

There are two extreme cases for the partition image. One is "the coarsest partition" which covers the whole S: $\forall x, y \in S$, $R_p(x)=R_p(y)$. The other is called "the finest partition" where each point in S is an individual region: $\forall x, y \in S$, $x \neq y \to R_p(x) \neq R_p(y)$.

Definition 9 Adjacent Regions:

Two regions $R_1$ and $R_2$ are adjacent if and only if $\exists x, y(x \in R_1$ and $y \in R_2)$ x and y are connected points.

Definition 10 Region Adjacency Graph:

Let P be a partition image on a multidimensional set S. There are k regions $(R_1, \ldots, R_k)$ in P where $S = \cup R_i$ and if $i \neq j \to R_i \cap R_j = \emptyset$. The region adjacency graph (RAG) consists of a set of vertices V and an edge set L. Let $V=\{v_1, \ldots, v_k\}$ where each $v_i$ is associated to the correspondent region $R_i$. The edge set L is $\{e_1, \ldots, e_l\}$, $L \subseteq V \hat{X} V$ where each $e_i$ is built between two vertices if the two correspondent regions are adjacent regions.

Figure 1:
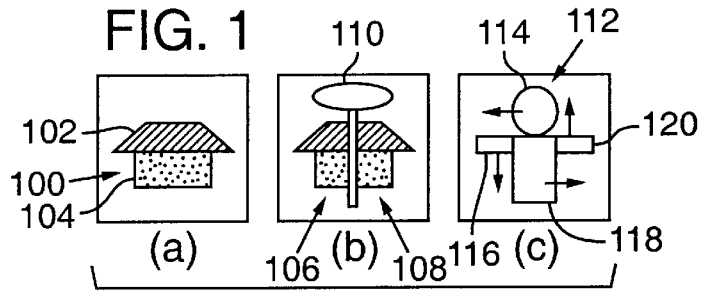
FIGS. 1A–C are examples illustrating different types of semantic objects to illustrate the difficulty of tracking general semantic objects.
Figure 3:
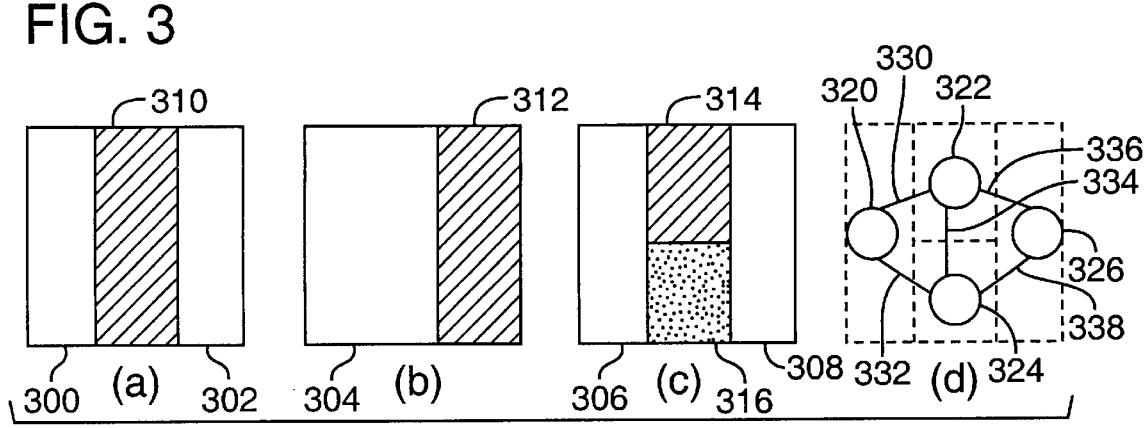
FIGS. 3A–D are diagrams illustrating examples of partition images and a method for representing partition images in a region adjacency graph.

FIGS. 3A–C illustrate examples of different types of partition images, and FIG. 3D shows an example of a region adjacency graph based on these partition images. In these examples, S is a set of two-dimensional images. The white areas 300–308, hatched areas 310–314, and spotted area 316 represent different regions in a two-dimensional image frame. FIG. 3A shows a partition image having two disconnected regions (white areas 300 and 302). FIG. 3B shows a connected partition image having two connected regions (white area 304 and hatched area 312). FIG. 3C shows a finer partition image as compared to FIG. 3A in that hatched area 310 of FIG. 3A comprises two regions: hatched area 314 and spotted area 316. FIG. 3D shows the corresponding region adjacency graph of the partition image in FIG. 3C. The vertices 320, 322, 324, 326 in the graph correspond to regions 306, 314, 316, and 308, respectively. The edges 330, 332, 334, 336, and 338 connect vertices of adjacent regions.

Definition 11 Vector Image Sequence:

Given m ($m \geq 1$) totally ordered complete lattices $L_1, \ldots, L_m$ of product L ($L=L_1 \hat{X} L_2 \hat{X} \ldots \hat{X} L_m$), a vector image sequence is a sequence of mapping $I_t$: $S \to L$, where S is a n-dimensional set and t is in the time domain.

Several types of vector image sequences are illustrated above in Table 1. These vector image sequences can be obtained either from a series of sensors, e.g. color images, or from a computed parameter space, e.g. dense motion fields. Although the physical meaning of the input signals varies from case to case, all of them can be universally regarded as vector image sequences.

Definition 12 Semantic Video Objects:

Let I be a vector image on a n-dimensional set S. Let P be a semantic partition image of I. $S = \cup_{i=1, \ldots, m} O_i$. Each $O_i$ indicates the location of a semantic video object.

Definition 13 Semantic Video Object Segmentation:

Let I be a vector image on a n-dimensional set S. Semantic video object segmentation is to find the object number m and the location of each object $O_i$, $i=1, \ldots, m$, where $S = \cup_{i=1, \ldots, m} O_i$.

Definition 14 Semantic Video Object Tracking:

Let $I_{t-1}$ be a vector image on a n-dimensional set S and $P_{t-1}$ be the corresponding semantic partition image at time t-1. $S = \cup_{i=1, \ldots, m} O_{t-1,i}$. Each $O_{t-1,i}(i=1, \ldots, m)$ is a semantic video object at time t-1. Semantic video object tracking in $I_t$ is defined as finding the semantic video object $O_{t,i}$ at time t, $i=1, \ldots, m$. $\forall x \in O_{t-1,i}$ and $\forall y \in O_{t,i}$: $P_{t-1}(x) = P_t(y)$.

Example Implementation

Figure 4:
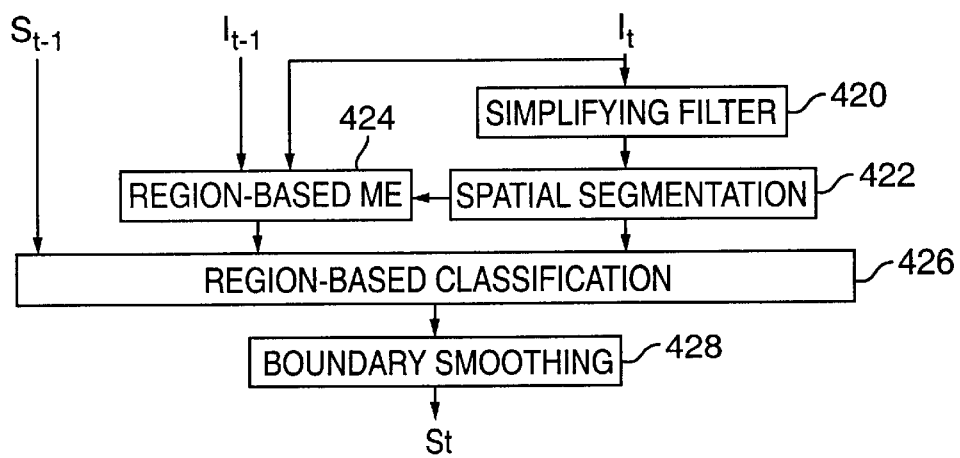
FIG. 4 is a flow diagram illustrating an implementation of a semantic object tracking system.

The following sections describe a specific implementation of a semantic video object tracking method in more detail. FIG. 4 is a block diagram illustrating the principal components in the implementation described below. Each of the blocks in FIG. 4 represent program modules that implement parts of the object tracking method outlined above. Depending on a variety of considerations, such as cost, performance and design complexity, each of these modules may be implemented in digital logic circuitry as well.

Using the notation defined above, the tracking method shown in FIG. 4 takes as input the segmentation result of a previous frame at time t−1 and the current vector image $I_t$. The current vector image is defined in m (m≥1) totally ordered complete lattices $L_1, \ldots, L_m$ of product L (see Definition 11) on a n-dimensional set S: $\forall p, p \in S, I_t(p)=\{L_1(p), L_2(p), \ldots, L_m(p)\}$.

Using this information, the tracking method computes a partition image for each frame in the sequence. The result of the segmentation is a mask identifying the position of each semantic object in each frame. Each mask has an object number identifying which object it corresponds to in each frame.

For example, consider a color image sequence as defined in Table 1. Each point p represents a pixel in a two-dimensional image. The number of points in the set S corresponds to the number of pixels in each image frame. The lattice at each pixel comprises three sample values, corresponding to Red, Green and Blue intensity values. The result of the tracking method is a series of two-dimensional masks identifying the position of all of the pixels that form part of the corresponding semantic video object for each frame.

Region Pre-processing

The implementation shown in FIG. 4 begins processing for a frame by simplifying the input vector image. In particular, a simplifying filter 420 cleans the entire input vector image before further processing. In designing this pre-processing stage, it is preferable to select a simplifying method that does not introduce spurious data. For instance, a low pass filter may clean and smooth an image, but may also make the boundaries of a video object distorted. Therefore, it is preferable to select a method that simplifies the input vector image while preserving the boundary position of the semantic video object.

Many non-linear filters, such as median filters or morphological filters, are candidates for this task. The current implementation uses a vector median filter, Median(•), for the simplification of the input vector image.

The vector median filter computes the median image value(s) of neighboring points for each point in the input image and replaces the image value at the point with the median value(s). For every point p in the n-dimensional set S, a structure element E is defined around it which contains all the connected points (see Definition 1 about connected points):

$E = \cup_{q \in S} \{D_{p,q}=1\}$

The vector median of a point p is defined as the median of each component within the structure element E:

$$Median(I_i(p)) = \left\{ \underset{q \in E}{median}\{Li(q)\}, \ldots, \underset{q \in E}{median}\{Lm(q)\} \right\}$$

By using such a vector median filter, small variation of the vector image $I_t$ can be removed while the boundaries of video objects are well preserved under the special design of the structure element E. As a result, the tracking process can more effectively identify boundaries of semantic video objects.

Region Extraction

After filtering the vector input image, the tracking process extracts regions from the current image. To accomplish this, the tracking process employs a spatial segmentation method 422 that takes the current image and identifies regions of connected points having "homogenous" image values. These connected regions are the regions of points that are used in region based motion estimation 424 and region-based classification 426.

In implementing a region extraction stage, there are three primary issues to address. First, the concept of "homogeneous" needs to be consolidated. Second, the total number of regions should be found. Third, the location of each region must be fixed. The literature relating to segmentation of vector image data describes a variety of spatial segmentation methods. Most common spatial segmentation methods use:

polynomial functions to define the homogeneity of the regions;

deterministic methods to find the number of regions; and/or boundary adjustment to finalize the location of all the regions.

These methods may provide satisfactory results in some applications, but they do not guarantee an accurate result for a wide variety of semantic video objects with non-rigid motion, disconnected regions and multiple colors. The required accuracy of the spatial segmentation method is quite high because the accuracy with which the semantic objects can be classified is dependent upon the accuracy of the regions. Preferably, after the segmentation stage, no region of the semantic object should be missing, and no region should contain an area that does not belong to it. Since the boundaries of the semantic video objects in the current frame are defined as a subset of all the boundaries of these connected regions, their accuracy directly impacts the accuracy of the result of the tracking process. If the boundaries are incorrect, then the boundary of the resulting semantic video object will be incorrect as well. Therefore, the spatial segmentation method should provide an accurate spatial partition image for the current frame.

The current implementation of the tracking method uses a novel and fast spatial segmentation method, called LabelMinMax. This particular approach grows one region at a time in a sequential fashion. This approach is unlike other parallel region growing processes that require all seeds to be specified before region growing proceeds from any seed. The sequential region growing method extracts one region after another. It allows more flexible treatment of each region and reduces the overall computational complexity.

The region homogeneity is controlled by the difference between the maximum and minimum values in a region. Assume that the input vector image $I_t$ is defined in m (m≥1) totally ordered complete lattices $L_1, \ldots, L_m$ of product L (see Definition 11):

$\forall p, p \in S, I_t(p)=\{L_1(p), L_2(p), \ldots, L_m(p)\}$.

The maximum and minimum values (MaxL and MinL) in a region R are defined as:

$$MaxL = \left\{ \max_{p \in R}\{Li(p)\}, \ldots, \max_{p \in R}\{Lm(p)\} \right\};$$

$$MinL = \left\{ \min_{p \in R}\{Li(p)\}, \ldots, \min_{p \in R}\{Lm(p)\} \right\};$$

If the difference between MaxL and MinL is smaller than a threshold (H=$\{h_1, h_2, \ldots, h_m\}$) that region is homogeneous:

$$\text{Homogeneity. } \forall\, i,\ 1 \le i \le m,\ \left( \max_{p \in R}\{Li(p)\} - \min_{p \in R}\{Li(p)\} \right) \le bi$$

The LabelMinMax method labels each region one after another. It starts with a point p in the n-dimensional set S.

Assume region R is the current region that LabelMinMax is operating on. At the beginning, it only contains the point p: R={p}. Next, LabelMinMax checks all of the neighborhood points of region R (see Definition 3) to see whether region R is still homogeneous if a neighborhood point q is inserted into it. A point q is added into region R if the insertion does not change the homogeneity of that region. The point q should be deleted from set S when it is added into region R. Gradually, region R expands to all the homogeneous territories where no more neighborhood points can be added. Then, a new region is constructed with a point from-the remaining points in S. This process continues until there are no more points left in S. The whole process can be clearly described by the following pseudo-code:

LabelMinMax:
NumberOfRegion=0;
While (S≠empty) {
   Take a point p from S: R={p}; S=S−{p};
   NumberOfRegion=NumberOfRegion+1;
   For all the points q in S {
     if (q is in neighborhood of R) {
       if ((R+{q}) is homogeneous) {
          R=R+{q};
          S=S−{q};
       }
     }
   }
   Assign a label to region R, e.g. NumberOfRegion.
}

LabelMinMax has a number of advantages, including:

- MaxL and MinL present a more precise description about a region's homogeneity compared to other criteria;
- The definition of homogeneity gives a more rigid control over the homogeneity of a region which leads to accurate boundaries;
- LabelMinMax provides reliable spatial segmentation results;
- LabelMinMax possesses much lower computational complexity than many other approaches.

While these advantages make LabelMinMax a good choice for spatial segmentation, it also possible to use alternative segmentation methods to identify connected regions. For example, other region growing methods use different homogeneity criteria and models of "homogenous" regions to determine whether to add points to a homogenous region. These criteria include, for example, an intensity threshold, where points are added to a region so long as the difference between intensity of each new point and a neighboring point in the region does not exceed a threshold. The homogeneity criteria may also be defined in terms of a mathematical function that describe how the intensity values of points in a region are allowed to vary and yet still be considered part of the connected region.

Region Based Motion Estimation

The process of region-based motion estimation 424 matches the image values in regions identified by the segmentation process with corresponding image values in the previous frame to estimate how the region has moved from the previous frame. To illustrate this process, consider the following example. Let $I_{t-1}$ be the previous vector image on a n-dimensional set S at time t−1 and let $I_t$ be the current vector image on the same set S at time t. The region extraction procedure has extracted N homogeneous regions $R_i$ (i=1, 2, . . . , N) in the current frame $I_t$:

$$S \cup_{i=1, \ldots, N} R_i.$$

Now, the tracking process proceeds to classify each region as belonging to exactly one of the semantic video objects in the previous frame. The tracking process solves this region-based classification problem using region-based motion estimation and compensation. For each extracted region $R_i$ in the current frame $I_t$, a motion estimation procedure is carried out to find where this region originates in the previous frame $I_{t-1}$. While a number of motion models may be used, the current implementation uses a translational motion model for the motion estimation procedure. In this model, the motion estimation procedure computes a motion vector $V_i$ for region $R_i$ that minimizes the prediction error (PE) on that region:

$$PE = \min_{V_i} \left\{ \sum_{p \in R_i} \|I_t(p) - I_{t-1}(p + V_i)\| \right\}$$

where $\|\cdot\|$ denotes the sum of absolute difference between two vectors and $V_i \leq V_{max}$ ($V_{max}$ is the maximum search range). This motion vector $V_i$ is assigned to region $R_i$ indicating its trajectory location in the previous frame $I_{t-1}$.

Other motion models may be used as well. For example, an affine or perspective motion model can be used to model the motion between a region in the current vector image and a corresponding region in the previous vector image. The affine and perspective motion models use a geometric transform (e.g., an affine or perspective transform) to define the motion of region between one frame and another. The transform is expressed in terms of motion coefficients that may be computed by finding motion vectors for several points in a region and then solving a simultaneous set of equations using the motion vectors at the selected points to compute the coefficients. Another way is to select an initial set of motion coefficients and then iterate until the error (e.g., a sum of absolute differences or a sum of squared differences) is below a threshold.

Region Based Classification

The region based classification process 426 modifies the location of each region using its motion information to determine the region's estimated position in the previous frame. It then compares this estimated position with the boundaries of semantic video objects in the previous frame ($S_t$) to determine which semantic video object that it most likely forms a part of.

To illustrate, consider the following example. Let $I_{t-1}$ and $I_t$ be the previous and current vector images on a n-dimensional set S and $P_{t-1}$ be the corresponding semantic partition image at time t−1:

$$S = \cup_{i=1, \ldots, m} O_{t-1,i}.$$

Each $O_{t-1,i}$ (i=1, . . . , m) indicates the location of a semantic video object at time t−1. Assume that there are N total extracted regions $R_i$ (i=1, 2, . . . , N), each having an associated motion vector $V_i$ (i=1, 2, . . . , N) in the current frame. Now, the tracking method needs to construct the current semantic partition image $P_t$ at the time t.

The tracking process fulfills this task by finding a semantic video object $O_{t-1,j}$ (j∈{1, 2, . . . , m}) for each region $R_j$ in the current frame.

Since the motion information for each region $R_i$ is already available at this stage, the region classifier 426 uses backward motion compensation to warp each region $R_i$ in the current frame towards the previous frame. It warps the region by applying the motion information for the region to the points in the region. Let's assume the warped region in the previous frame is $R'_i$:

$R'_i = \cup_{p \in Ri}\{P+V_i\}$.

Ideally, the warped region $R'_i$ should fall onto one of the semantic video objects in the previous frame:

$\exists j, j \in \{1,2, \ldots, m\}$ and $R'_i \subseteq O_{t-1,j}$.

If this is the case, then the tracking method assigns the semantic video object $O_{t-1,j}$ to this region $R_i$. However, in reality, because of the potentially ambiguous results from the motion estimation process, $R'_i$ may overlap with more than one semantic video object in the previous frame, i.e.

$R'_i \not\subset O_{t-1,j}$, $j=1, 2, \ldots, m$.

The current implementation uses majority criteria M for the region-based classification. For each region $R_i$ in the current frame, if the majority part of the warped region $R'_i$ comes from a semantic video object $O_{t-1,j}(j \in \{1, 2, \ldots, m\})$ in the previous frame, this region is assigned to that semantic video object $O_{t-1,j}$:

$\forall p \in R_i$ and $\forall q \in O_{t-1,j}$, $P_t(p) = P_{t-1}(q)$.

More specifically, the semantic video object $O_{t-1,j}$ that has the majority overlapped area (MOA) with $R'_i$ is found as:

$$M:MOA = \max_j \left\{ \sum_{p \in R_i} N_j(p+V_i), \ j = 1, \ldots, m \right\};$$

$$N_j(p+V_i) = \begin{cases} 1 & (p+V_i) \in O_{t-1,j} \\ 0 & (p+V_i) \notin O_{t-1,j} \end{cases}$$

Piece by piece, the complete semantic video objects $O_{t,j}$ in the current frame are constructed using this region-based classification procedure for all the regions $R_i$ (i=1, 2, ..., N) in the current frame. Assume a point $q \in O_{t-1,j}$, $O_{t,j} = \cup_{p \in S}\{p|P_t(p)=P_{t-1}(q)\}$, $j=1, 2, \ldots, m$.

According to the design of this region-based classification process, there will not be any holes/gaps or overlaps between different semantic video objects in the current frame:

$\cup_{i=1,\ldots,m} O_{t,i} = \cup_{i=1,\ldots,N} R_i = \cup_{i=1,\ldots,m} O_{t-1,i} = S$.

$\forall i, j \in \{1, \ldots, m\}$, $i \neq j \rightarrow O_{t,i} \cap O_{t,j} = \emptyset$;

This is an advantage of the tracking system compared to tracking systems that track objects into frames where the semantic video object boundaries are not determined. For example, in forward tracking systems, object tracking proceeds into subsequent frames where precise boundaries are not known. The boundaries are then adjusted to fit an unknown boundary based on some predetermined criteria that models a boundary condition.

Region Post-Processing

Let's assume the tracking result in the current frame is the semantic partition image $P_t$. For various reasons, there might be some errors in the region-based classification procedure. The goal of the region post-processing process is to remove those errors and at the same time to smooth the boundaries of each semantic video object in the current frame. Interestingly, the partition image is a special image that is different from the traditional ones. The value in each point of this partition image only indicates the location of a semantic video object. Therefore, all the traditional linear or non-linear filters for signal processing are not generally suitable for this special post-processing.

The implementation uses a majority operator $M(\bullet)$ to fulfil this task. For every point p in the n-dimensional set S, a structure element E is defined around it which contains all the connected points (see 1 about connected points):

$E = \cup_{q \in S}\{D_{p,q}=1\}$

First, the majority operator $M(\bullet)$ finds a semantic video object $O_{t,j}$ which has the maximal overlapped area (MOA) with the structure element E:

$$MOA = \max_j \left\{ \sum_{q \in E} N_j(q), \ j=1, \ldots, m \right\}; \quad N_j(q) = \begin{cases} 1 & q \in O_{t,j} \\ 0 & q \notin O_{t,j} \end{cases}$$

Second, the majority operator $M(\bullet)$ assigns the value of that semantic video object $O_{t,j}$ to the point p:

Let $q \in O_{t,j}$, $P_t(p) = M(P) = P_t(q)$.

Because of the adoption of the majority criteria, very small areas (which most likely are errors) may be removed while the boundaries of each semantic video object are smoothed.

Brief Overview of a Computer System

Figure 5:
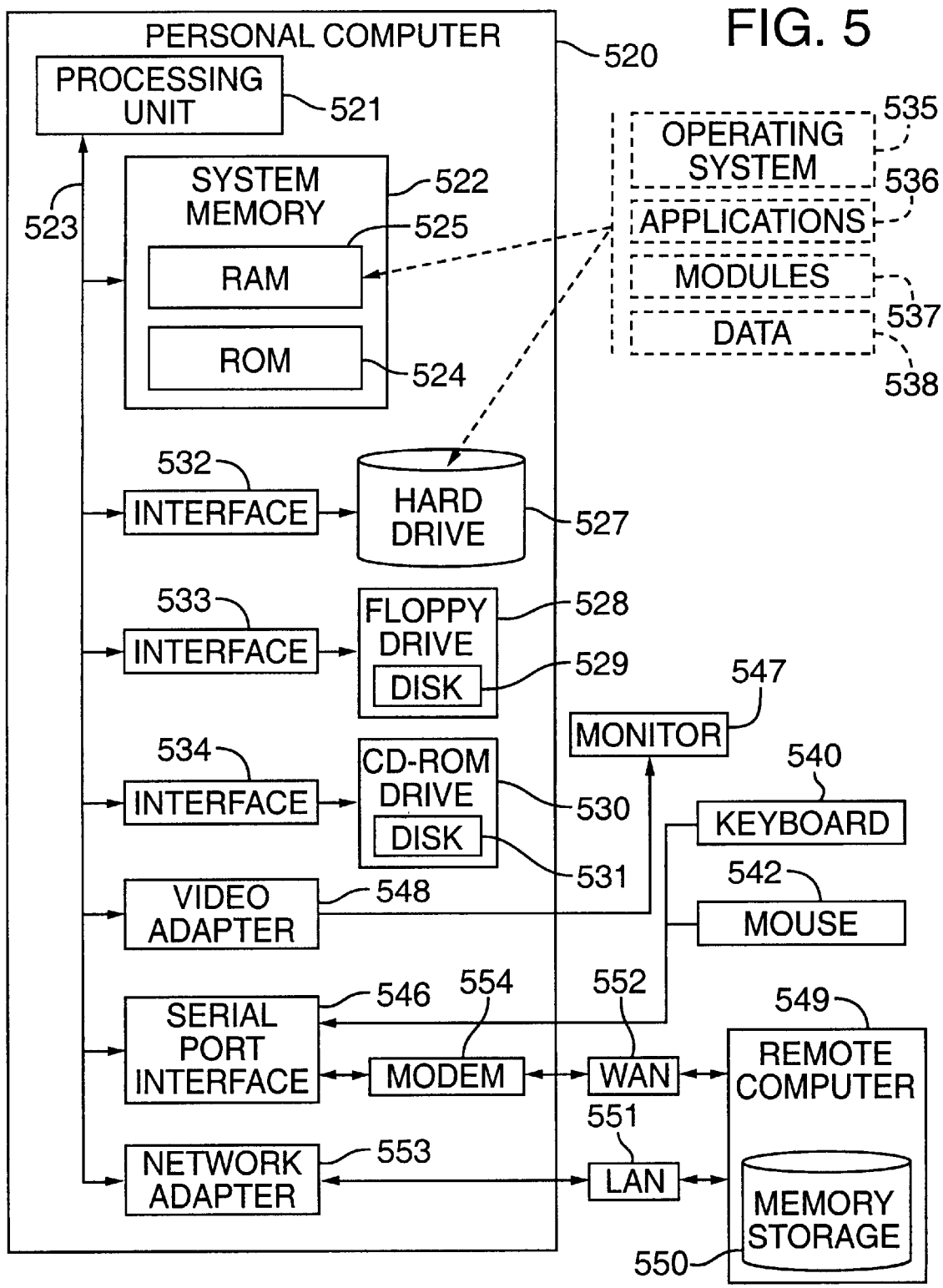
FIG. 5 is a block diagram of a computer system that serves as an operating environment for an implementation of the invention.

FIG. 5 and the following discussion are intended to provide a brief, general description of a suitable computing environment in which the invention may be implemented. Although the invention or aspects of it may be implemented in a hardware device, the tracking system described above is implemented in computer-executable instructions organized in program modules. The program modules include the routines, programs, objects, components, and data structures that perform the tasks and implement the data types described above.

While FIG. 5 shows a typical configuration of a desktop computer, the invention may be implemented in other computer system configurations, including hand-held devices, multiprocessor systems, microprocessor-based or programmable consumer electronics, minicomputers, mainframe computers, and the like. The invention may also be used in distributed computing environments where tasks are performed by remote processing devices that are linked through a communications network. In a distributed computing environment, program modules may be located in both local and remote memory storage devices.

FIG. 5 illustrates an example of a computer system that serves as an operating environment for the invention. The computer system includes a personal computer 520, including a processing unit 521, a system memory 522, and a system bus 523 that interconnects various system components including the system memory to the processing unit 521. The system bus may comprise any of several types of bus structures including a memory bus or memory controller, a peripheral bus, and a local bus using a bus architecture such as PCI, VESA, Microchannel (MCA), ISA and EISA, to name a few. The system memory includes read only memory (ROM) 524 and random access memory (RAM) 525. A basic input/output system 526 (BIOS), containing the basic routines that help to transfer information between elements within the personal computer 520, such as during start-up, is stored in ROM 524. The personal computer 520 further includes a hard disk drive 527, a magnetic disk drive 528, e.g., to read from or write to a removable disk 529, and an optical disk drive 530, e.g., for reading a CD-ROM disk 531 or to read from or write to other optical media. The hard disk drive 527, magnetic disk drive 528, and optical disk drive 530 are connected to the system bus 523 by a hard disk drive interface 532, a magnetic disk drive interface 533, and an optical drive interface 534, respectively. The drives and their associated computer-readable media provide nonvolatile storage of data, data structures, computer-executable instructions (program code such as dynamic link libraries, and executable files), etc. for the personal computer 520. Although the description of computer-readable media above refers to a hard disk, a removable magnetic disk and a CD, it can also include other types of media that are readable by a computer, such as magnetic cassettes, flash memory cards, digital video disks, Bernoulli cartridges, and the like.

A number of program modules may be stored in the drives and RAM 525, including an operating system 535, one or more application programs 536, other program modules 537, and program data 538. A user may enter commands and information into the personal computer 520 through a keyboard 540 and pointing device, such as a mouse 542. Other input devices (not shown) may include a microphone, joystick, game pad, satellite dish, scanner, or the like. These and other input devices are often connected to the processing unit 521 through a serial port interface 546 that is coupled to the system bus, but may be connected by other interfaces, such as a parallel port, game port or a universal serial bus (USB). A monitor 547 or other type of display device is also connected to the system bus 523 via an interface, such as a display controller or video adapter 548. In addition to the monitor, personal computers typically include other peripheral output devices (not shown), such as speakers and printers.

The personal computer 520 may operate in a networked environment using logical connections to one or more remote computers, such as a remote computer 549. The remote computer 549 may be a server, a router, a peer device or other common network node, and typically includes many or all of the elements described relative to the personal computer 520, although only a memory storage device 50 has been illustrated in FIG. 5. The logical connections depicted in FIG. 5 include a local area network (LAN) 551 and a wide area network (WAN) 552. Such networking environments are commonplace in offices, enterprise-wide computer networks, intranets and the Internet.

When used in a LAN networking environment, the personal computer 520 is connected to the local network 551 through a network interface or adapter 553. When used in a WAN networking environment, the personal computer 520 typically includes a modem 554 or other means for establishing communications over the wide area network 552, such as the Internet. The modem 554, which may be internal or external, is connected to the system bus 523 via the serial port interface 546. In a networked environment, program modules depicted relative to the personal computer 520, or portions thereof, may be stored in the remote memory storage device. The network connections shown are merely examples and other means of establishing a communications link between the computers may be used.

Conclusion

While the invention is described in the context of specific implementation details, it is not limited to these specific details. The invention provides a semantic object tracking method and system that identifies homogenous regions in a vector image frame and then classifies these regions as being part of a semantic object. The classification method of the implementation described above is referred to as "backward tracking" because it projects a segmented region into a previous frame where the semantic object boundaries are previously computed.

Note that this tracking method also generally applies to applications where the segmented regions are projected into frames where the semantic video object boundaries are known, even if these frames are not previous frames in an ordered sequence. Thus, the "backward" tracking scheme described above extends to applications where classification is not necessarily limited to a previous frame, but instead to frames where the semantic object boundaries are known or previously computed. The frame for which semantic video objects have already been identified is more generally referred to as the reference frame. The tracking of the semantic objects for the current frame are computed by classifying segmented regions in the current frame with respect to the semantic object boundaries in the reference frame.

As noted above, the object tracking method applies generally to vector image sequences. Thus, it is not limited to 2D video sequences or sequences where the image values represent intensity values.

The description of the region segmentation stage identified criteria that are particularly useful but not required for all implementations of semantic video object tracking. As noted, other segmentation techniques may be used to identify connected regions of points. The definition of a region's homogeneity may differ depending on the type of image values (e.g., motion vectors, color intensities, etc.) and the application.

The motion model used to perform motion estimation and compensation can vary as well. Though computationally more complex, motion vectors may be computed for each individual point in a region. Alternatively, a single motion vector may be computed for each region, such as in the translational model described above. Preferably, a region based matching method should be used to find matching regions in the frame of interest. In region based matching, the boundary or mask of the region in the current frame is used to exclude points located outside the region from the process of minimizing the error between the predicted region and corresponding region in the target frame. This type of approach is described in U.S. Pat. No. 5,796,855, entitled "Polygon Block Matching Method," which is hereby incorporated by reference.

In view of the many possible implementations of the invention, the implementation described above is only an example of the invention and should not be taken as a limitation on the scope of the invention. Rather, the scope of the invention is defined by the following claims. We therefore claim as our invention all that comes within the scope and spirit of these claims.

We claim:

1. A method for tracking video objects in video frames, the method comprising:

performing spatial segmentation on a current video frame to identify plural regions of pixels with homogenous intensity values;

performing motion estimation between each of the plural regions in the current video frame and a previous video frame in which a boundary of a video object was previously computed;

using the motion estimation for each of the plural regions to warp pixel locations in the region to locations in the previous video frame;

determining whether the warped pixel locations are within the previously computed boundary of the video object in the previous video frame to identify a set of the plural regions that are likely to be part of the video object in the current video frame; and forming a boundary of the video object in the current video frame as a combination of each of the plural regions in the current video frame that are in the set.

2. The method of claim 1 further including:

repeating claim 1 for a subsequent video frame using the boundary of the video object in the current video frame as a reference boundary for the subsequent video frame.

3. The method of claim 1 further including:
filtering the current video frame to remove noise from the current video frame before performing the spatial segmentation.

4. The method of claim 1 wherein the spatial segmentation includes, for each of the plural regions, ensuring that a difference between a maximum intensity value in the region and a minimum intensity value in the region is below a threshold.

5. The method of claim 1 wherein the spatial segmentation is a sequential region growing comprising:
starting with a first pixel location in the current video frame, growing a first region of connected pixels around the first pixel location by adding pixel locations to the first region such that a homogeneity criteria is satisfied;
when no boundary pixels around the first region satisfy the homogeneity criteria, repeating the growing for another region with a pixel location outside the first region; and
continuing the growing until each of the pixel locations in the current video frame is identified as being part of one of the plural regions.

6. The method of claim 1 wherein the motion estimation comprises:
for each of the plural regions identified through spatial segmentation in the current video frame, performing a region-based motion estimation including matching only pixels within the region with pixels in the previous video frame; and
applying a motion model to approximate motion of the pixels within the region to corresponding locations in the previous frame.

7. The method of claim 6 wherein the motion model is used to find a motion vector for each of the plural regions.

8. The method of claim 1 wherein the determining includes for each of the plural regions:
counting the warped pixel locations that are within the boundary of the video object in the previous video frame;
when a majority of the warped pixel locations are within the boundary of the video object, classifying the region as being in the set that are likely to be part of the video object in the current video frame.

9. A computer-readable medium having instructions stored thereon for causing a computer system programmed thereby to perform the method of claim 1.

10. A computer system for tracking semantic objects in a vector image sequence of image frames, the system comprising:
a spatial segmentation module for segmenting a current image frame in the vector image sequence into plural regions, each of the plural regions comprising image points having image values that satisfy a homogeneity criterion;
a motion estimator module for estimating the motion between each of the plural regions in the current image frame and a reference image frame, and for determining a motion parameter for each of the plural regions that approximates the motion of the region between the current image frame and the reference image frame, wherein the reference image frame includes a semantic object for which a semantic object boundary was previously computed; and
a region classifier module for applying the motion parameter of each of the plural regions to the region to compute a predicted region in the reference image frame, and for classifying each of the plural regions as being part of or not being part of the semantic object depending on the extent to which the predicted region for the region falls within the previously computed semantic object boundary in the reference image frame;
wherein a corresponding semantic object boundary in the current image frame is formed from each region classified as being part of the semantic object.

11. The computer system of claim 10 wherein the homogeneity criteria of the spatial segmentation module comprises a maximum difference value between a maximum image value for a first region and a minimum image value for the first region, and wherein the spatial segmentation module selectively adds neighboring image points to the first region so long as the first region satisfies the homogeneity criteria.

12. The computer system of claim 10 wherein the motion parameter of each of the plural regions is a motion vector.

13. The computer system of claim 10 wherein:
the reference image frame includes two or more semantic objects, each of the two or more semantic objects occupying a non-overlapping area of the reference image frame,
the region classifier module classifies each of the plural regions as being part of one of the two or more semantic objects depending on which of the two or more semantic objects in the reference image frame has maximum overlap with the predicted region for the region, and
wherein corresponding semantic object boundaries in the current image frame are formed from the plural classified regions.

14. The computer system of claim 13 further including:
a majority operator for defining a structure of points around each image point in the current image frame.

15. A method for tracking semantic objects in vector image sequences, the method comprising:
performing spatial segmentation on a current image frame to identify plural regions of discrete image points with homogenous image values;
performing motion estimation between each of the plural regions in the current image frame and a target image frame in which a boundary of a semantic object is known;
using the motion estimation for each of the plural regions to warp the image points in the region to locations in the target image frame;
for each region of the plural regions, when at least a threshold amount of the warped image points for the region overlap the semantic object with the known boundary in the target image frame, classifying the region as originating from the semantic object; and
forming a boundary of the semantic object in the current image frame based upon each of the plural regions in the current image frame that are classified as originating from the semantic object.

16. The method of claim 15 further including:
for each of one or more additional image frames,
designating the current image frame as the target image frame;
designating the additional image frame as the current image frame; and
repeating claim 15.

17. The method of claim 15 wherein each of the plural regions is determined to be homogenous by only adding neighboring image points to the region where the difference between a maximum image value and a minimum image value in the region after adding each neighboring image point is below a threshold.

18. The method of claim 15 wherein:
the target image frame is the previous image frame of the current image frame,
each of the plural regions segmented from the current image frame is classified as originating from exactly one semantic object,
boundaries for semantic objects in the current image frame are computed based upon boundaries of regions classified as originating from the respective semantic objects, and
claim 15 is repeated for successive image frames in the vector image sequence.

19. A computer-readable medium having instructions stored thereon for causing a computer system programmed thereby to perform the method of claim 15.

20. A method for tracking semantic objects in vector image sequences, the method comprising:
performing spatial segmentation on a current image frame to identify plural regions of discrete image points with homogenous image values, where each of the plural regions comprises image points, and where each of the plural regions is determined to be homogenous by only adding neighboring image points to the region where the difference between a maximum image value and a minimum image value in the region after adding each neighboring image point is below a threshold;
performing region-based motion estimation between each of the plural regions in the current image frame and an immediate previous image frame in the vector image sequence in which a boundary of a semantic object is known;
using the motion estimated for each of the plural regions to warp the image points in the region to locations in the immediate previous image frame;
for each of the plural regions, when at least a threshold amount of the warped image points for the region overlap the semantic object with the known boundary in the immediate previous image frame, classifying the region as originating from the semantic object; and
forming a boundary for the semantic object in the current image frame based upon which of the plural regions in the current image frame are classified as originating from the semantic object.

21. A method of tracking an object in a vector image sequence using backward region-based classification, the method comprising:
computing a boundary of an object in a first image frame of a vector image sequence;
segmenting a second image frame of the vector image sequence into plural regions;
based upon motion estimates, warping each of the plural regions backward into the first image frame;
for each of the plural regions of the second image frame, if a threshold portion of the warped region lies within the previously computed boundary in the first image frame, classifying the region of the second image frame as part of the object.

22. The method of claim 21 further comprising:
forming a new boundary of the object in the second image frame from one or more of the plural regions classified as part of the object.

23. The method of claim 22 further comprising:
repeating the segmenting, warping, and classifying for a third image frame, wherein the warping proceeds from the third image frame backward into the second image frame, and wherein the classifying occurs by comparison to the new boundary.

24. The method of claim 21 wherein the segmenting comprises:
growing a first region of the plural regions from a first image point by adding neighboring image points that satisfy a homogeneity criterion for the first region, wherein the homogeneity criterion constrains the difference between a maximum image point value and a minimum image point value in the first region; and
repeating the growing for other regions of the plural regions until each image point of the second image frame is part of one of the plural regions.

25. The method of claim 21 wherein the first image frame includes plural objects having boundaries, and wherein the classifying indicates one of the plural objects for each of the plural regions of the second image frame.

26. A computer-readable medium having instructions stored thereon for causing a computer system programmed thereby to perform the method of claim 21.

27. A computer-readable medium having instructions stored thereon for causing a computer system programmed thereby to perform a method of tracking an object in a vector image sequence using backward region-based classification, the method comprising:
computing a boundary of an object in a previous image frame of a vector image sequence;
segmenting a current image frame of a vector image sequence into plural regions;
based upon motion estimates for the plural regions of the current image frame, warping each of the plural regions backward into the previous image frame;
for each of the plural regions of the current image frame, if a threshold portion of the warped region lies within the previously computed boundary of the object in the previous image frame, classifying the region of the current image frame as part of the object.

28. A method of tracking an object in a vector image sequence using backward region-based classification, the method comprising:
computing a boundary of an object in a first image frame of a vector image sequence;
segmenting a second image frame of the vector image sequence into plural regions;
for each of the plural regions of the second image frame, associating the region with a corresponding region of the first image frame based upon motion estimation from the second image frame back to the first image frame; and
if a threshold portion of the associated corresponding region of the first image frame lies within the previously computed boundary in the first image frame, classifying the region of the second image frame as part of the object.

29. The method of claim 28 further comprising:
forming a new boundary of the object in the second image frame from one or more of the plural regions classified as part of the object.

30. The method of claim 29 further comprising:
repeating the segmenting, associating, and classifying for a third image frame, wherein the associating is based upon motion estimation from third image frame back to the second image frame, and wherein the classifying occurs by comparison to the new boundary.

31. A computer-readable medium having instructions stored thereon for causing a computer system programmed thereby to perform the method of claim 28.

* * * * *